(12) United States Patent
Abhinav et al.

(10) Patent No.: US 12,399,871 B1
(45) Date of Patent: Aug. 26, 2025

(54) AUTOMATED PROGRAM GENERATOR FOR DATABASE OPERATIONS

(71) Applicant: Morgan Stanley Services Group Inc., New York, NY (US)

(72) Inventors: Kumar Abhinav, Cumming, GA (US); Jensen Zhang, Brooklyn, NY (US); Balakrishna Pulivarthi, Cumming, GA (US); Kavitha Bandarupalli, Cumming, GA (US); Vamsi Katneni, Alpharetta, GA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/930,012

(22) Filed: Oct. 29, 2024

(51) Int. Cl.
*G06F 16/21* (2019.01)
*G06F 7/08* (2006.01)

(52) U.S. Cl.
CPC .............. *G06F 16/213* (2019.01); *G06F 7/08* (2013.01)

(58) Field of Classification Search
CPC .................................................... G06F 16/213
See application file for complete search history.

(56) References Cited

U.S. PATENT DOCUMENTS

| | | | |
|---|---|---|---|
| 8,407,237 B1 | 3/2013 | Kudryavtsev et al. | |
| 11,768,851 B2* | 9/2023 | Ossher | G06F 16/212 |
| | | | 707/756 |
| 12,174,830 B2* | 12/2024 | Zhang | G06F 16/24542 |
| 12,235,799 B2* | 2/2025 | Periyagaram | G06F 16/17 |
| 2004/0031030 A1* | 2/2004 | Kidder | H04L 41/22 |
| | | | 717/172 |
| 2005/0222990 A1 | 10/2005 | Milne | |
| 2006/0149706 A1 | 7/2006 | Prang et al. | |
| 2007/0061287 A1* | 3/2007 | Le | G06F 16/24539 |
| 2008/0177770 A1* | 7/2008 | Friedlander | G06F 21/6227 |
| 2011/0213759 A1* | 9/2011 | Zazrivec | G06F 16/213 |
| | | | 707/769 |
| 2013/0060731 A1 | 3/2013 | Bailey, Jr. et al. | |
| 2019/0007895 A1* | 1/2019 | Bregler | G06F 9/445 |
| 2021/0165776 A1 | 6/2021 | Nejad et al. | |
| 2021/0208858 A1* | 7/2021 | Munaganuru | G06F 8/73 |
| 2021/0224409 A1* | 7/2021 | Avanes | G06F 21/6218 |
| 2021/0248143 A1* | 8/2021 | Khillar | G06F 16/2379 |
| 2023/0350889 A1 | 11/2023 | Elad et al. | |
| 2024/0028305 A1 | 1/2024 | Francois | |
| 2025/0156380 A1* | 5/2025 | Desmarets | G06F 16/252 |
| 2025/0156384 A1* | 5/2025 | Rajagopalan | H04L 51/02 |

* cited by examiner

*Primary Examiner* — Sherief Badawi
(74) *Attorney, Agent, or Firm* — Leason Ellis LLP

(57) ABSTRACT

A computer-implemented method or system is provided for generating programming code automatically for performing database operations. At least one computing device accesses at least one input file. The at least one input file is processed by the at least one computing device to identify at least one operation to be performed on an object associated with a database, wherein the processing further includes generating a database schema. Further, the at least one computing device is configured to generate a plurality of data files representing the at least one operation, and to sort information in the at least one data file. Further, the at least one computing device is configured to determine, as a function of the sorting, an order of steps associated with the at least one operation. Programming code is automatically generated for performing the at least one database operation in accordance with the determined order of steps.

18 Claims, 12 Drawing Sheets

HIGH-LEVEL PROCSS FLOW

MDM execution: Input file
700

Original File
<Table1Defn>
<Column1>1234</Column1>
<Column2>12</Column2>
<Active>1</Active>
</Table1Defn>

702

Modified File
<Table1Defn>
<Column1>1234</Column1>
<Column2>12</Column2>
<Active>1</Active>
</Table1Defn>
<Table1Defn>
<Column1>1234</Column1>
<Column2>123</Column2>
<Active>1</Active>
</Table1Defn>

MDM execution cont...: XML Diff

| Change Action | From | To |
|---|---|---|
| INSERT | | \<Table1Defn\>\<Column1\>1234\</Column1\>\<Column2\>123\</Column2\>\<Active\>1\</Active\>\</Table1Defn\> |

AUTOMATED PROGRAM GENERATOR FOR DATABASE OPERATIONS

FIELD

The present disclosure relates, generally, to information technology systems and, more particularly, to automatic data detection and computer programming generation.

BACKGROUND

Database management systems, particularly in the enterprise, comprise highly complex and large-scale file repositories that can include large numbers of data tables and database objects. The tables and objects can be used to insert, retrieve, update data stored in a given repository.

Unfortunately, complexities associated with such large-scale database systems render such operations impractical for most people, which places a significant burden on specialized users in the enterprise to accommodate data processing requests made by various departments. In many database management systems, particularly large, complicated relational database systems, structured query language ("SQL") needs to be written, tested, and executed in order to implement data processing. Concerns of sufficient data protection, database integrity, and maintaining continual data availability limits the ability for generating SQL programming code, and require only highly technical set of persons in the enterprise to perform such operations, which can result in lengthy wait times for database operations to be completed.

It is with respect to these and other considerations that the disclosure made herein is presented.

BRIEF SUMMARY

In one or more implementations, a computer-implemented method or system is provided for generating programming code automatically for performing database operations. At least one computing device configured by executing programming instructions stored on processor accesses at least one input file. The at least one input file is processed by the at least one computing device to identify at least one operation to be performed on an object associated with a database, wherein the processing further includes generating a database schema. Further, the at least one computing device is configured to generate a plurality of data files representing the at least one operation, and to sort information in the at least one data file. Further, the at least one computing device is configured to determine, as a function of the sorting, an order of steps associated with the at least one operation. Programming code is automatically generated for performing the at least one database operation in accordance with the determined order of steps.

In one or more implementations, generating the at least one data file further comprises: generating a first folder for storing at least one database schema file representing database operations associated with a new database object; generating a second folder for storing at least one database schema file representing database operations associated with an existing database object; determining, as a function of processing the at least one input file, that the at least one database schema file is to be stored in at least one of the first folder and the second folder; and storing, as a function of the determining, the at least one database schema file in at least one of the first folder and the second folder.

In one or more implementations, where the at least one database schema file is stored in only the first folder the at least one computing device generates programming code to include at least one programming statement for adding a database operation. Where the at least one database schema file is stored in only the first folder, the at least one computing device generates programming code to include at least one programming statement for an add database operation. Where the at least one database schema file is stored in only the second folder, the at least one computing device generates programming code to include at least one programming statement for a delete database operation. Where the at least one database schema file is stored in both the first folder and the second folder, the at least one computing device generates programming code to include at least one programming statement for an update database operation.

In one or more implementations, sorting the information in the at least one data file by the at least one computing device further comprises performing a diff operation and generating, as a function of the diff operation, at least one node including the information. Further the at least one computing device identifies multiple rows of data in the at least one node, generates a respective identifier associated with each of the rows, and sorts the information set forth each of the rows based on the respective identifier.

In one or more implementations, at least one of the plurality of generated data files is associated with implementing an upgrade to a database table and at least one of the plurality of generated data files is associated with implementing a downgrade to the database table.

In one or more implementations, generating the programming code further comprises: generating, by the at least one computing device, at least one of a delete command, an insert command, and an update command for implementing the upgrade to the database table; and generating, by the at least one computing device, at least one of an update command, a delete command, and an insert command for implementing the downgrade to the database table.

In one or more implementations, the at least one computing device determines, for each of the upgrade to the database table and the downgrade to the database table, existence of a not null restriction and default values and prepares at least one where clause as a function of the determining the not null restriction and the default values.

In one or more implementations, the at least one computing device provides a metadata management tool that, when executed by the at least one computing device, automatically generates the programming code for performing the at least one database operation.

In one or more implementations, the programming code is structured query language.

In one or more implementations, the at least one database operation is to be performed in SYBASE.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIG. 7 illustrates an example input file, which is usable by the metadata management tool for performing operations, such as shown and described herein;

FIG. 8 illustrates results of an example XML Diff file process, which is usable by the metadata management tool for performing operations, such as shown and described herein;

DETAILED DESCRIPTION OF THE EMBODIMENTS

Figure 1:
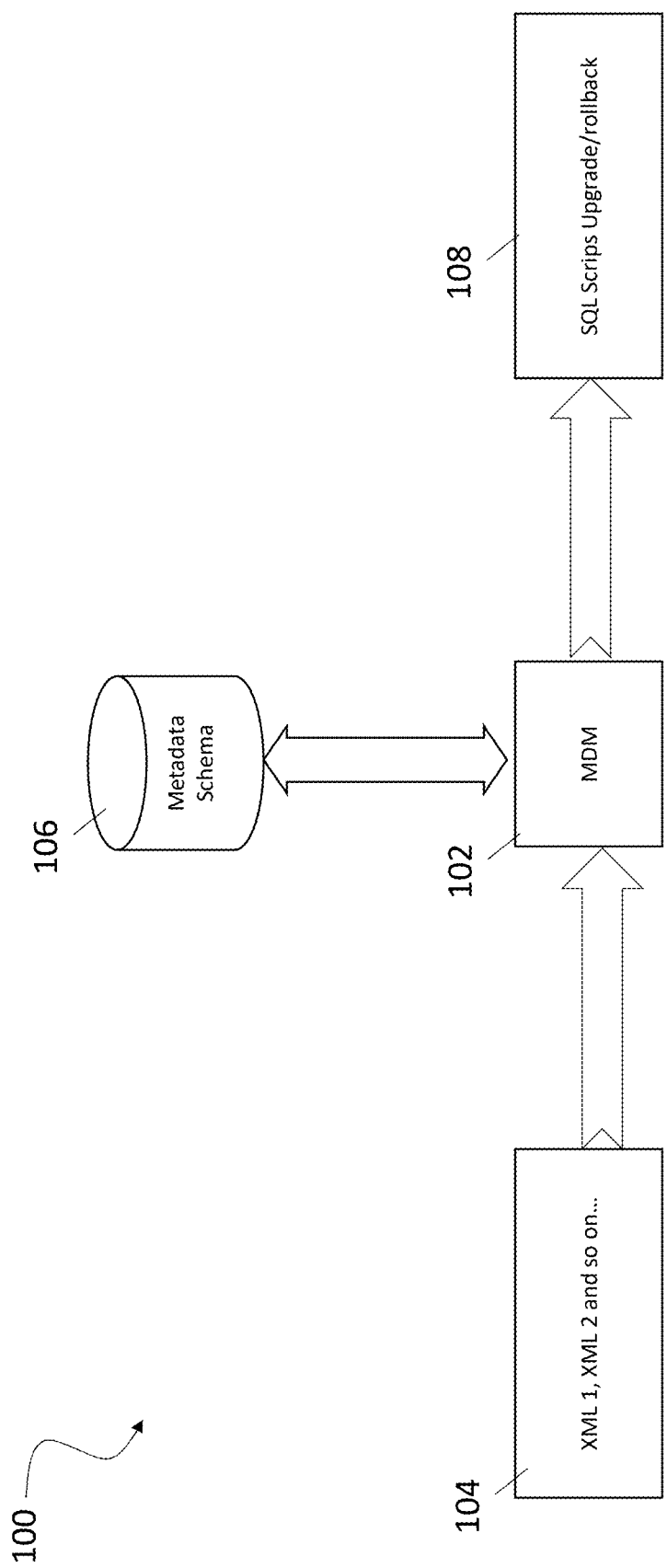
FIG. 1 shows a high-level overview of components of the present disclosure, including a metadata management tool, a metadata schema, a data file source, and generated programming code.

By way of summary and introduction, the present disclosure regards inventive subject matter that can be implemented for dynamic and automatic generation of database management programming instructions. For example, one or more computing devices can be configured to generate enterprise-wide structured query language ("SQL") scripts for use in the database applications, such as SYBASE. In particular implementations, the present disclosure includes a computer tool that generates program code, which is referred to, generally, as a metadata management tool ("MDM tool"). The MDM tool automates generation of code that, when executed by for data processing and database operations. Programming statements, such as SQL scripts, can be generated automatically based on user-defined input and can be saved in XML, XSL, or other suitable data structure formatted, in accordance with particular design implementations. The automation of the present disclosure provides significant improvements in computer hardware and software, time, and human resources.

The MDM tool is highly extensible and supports diverse implementations, including in complex database configurations. A plurality of data sources, such as tables in one or more databases, respectively referenced in a plurality of XML files can be dynamically combined in a single SQL file. SQL can be generated automatically that, when executed by one or more computing devices, cause the computing device(s) to perform database operations using information stored in the XML files. For example, automatically generated SQL code by the MDM tool can be executed to create a table in which one column of the table is based on data in one XML file and another column of the table is based on data and information in a different XML file. Alternatively, a single XML file can be processed to generate multiple SQL statements or files. Accordingly, the MDM provides significant flexibility and efficiency in database operations.

In one or more implementations, a data file repository can include one or more "checked-in" files. Such files can be processed by one or more computing devices using data stored in XML records. A delta of stored database tables or other objects representing changed versions requiring database management can be determined. For example, the most recent commit made to the repository can be identified and SQL generated automatically for operating on the identified delta. Executing programming (e.g., SQL) that is generated automatically as a function of the MDM tool can be executed to generate new database tables or other objects, revise to data structures (e.g., database table structures), update stored data, or perform other complex database management. Operations can be effected using, for example, XML for effective, on-demand or on-the-fly database structure and format operations. The present disclosure reduces enterprise-wide dependence on database teams, increases flexibility for developers, and provides overall improved database quality assurance.

As noted herein, one or more files can be checked into a repository and database operations operated thereon. As noted herein, the present disclosure includes steps for processing a plurality of XML files to be used to generated a single SQL file. Take, for example, 5 XML files: $XML_1$, $XML_2$, $XML_3$, $XML_4$ and $XML_5$. One more computing devices can be configured to extract the data from the respective XML files and, thereafter, transform the information therein into a format usable by the MDM tool for generating SQL. One or more implementations of the present disclosure can include business logic encoded within a form of a MDM tool library, which contributes to the computing device(s) ability to enforce respective dependencies. Continuing with this example, if $XML_1$, $XML_2$ refer to a single database table, the MDM tool library ensures accuracy of the transformation of the two XML files to the SQL file is correct. The MDM tool library can ensure, regardless of whether the result of the generated script is an INSERT, UPDATE, or other suitable operation. In one or more implementations, PERL can be used to transform the XML files to scripts including, for example, upgrade and rollback.

Conversely, the present disclosure includes one or more computing devices configured for single XML files, each into to multiple SQLs. The MDM tool can ensure referential integrity constraints during the transformation process, for example, by employing a schema while parsing the XML files via business logic within the MDM tool to ensure one SQL file is generated in combination with discrete SQL scripts. For example, the flexibility of the MDM tool will be is evident for providing a single process comprising a plurality of statements associated with a single large file (e.g., XML file). Alternatively (or in addition), SQL scripts can be executed individually as well. Further, a logging mechanism within the MDM tool documents execution details, which can be used to reveal any issues, such that caused interruption in the process, that occurred during execution. Logging is also usable to persist executed changes and enable resumption of the process prior to or at the time of the issue.

As noted herein, the MDM tool can use information representing most frequent commit(s) to a file repository and limit changes to just those data sources in which changes (i.e., a delta) are identified. For example, an XML file representing version 1.0 of a data file is processed and the data file is committed to a repository. An XML file is processed to determine changes to the data file as version 1.1. The MDM tool can operated to generate SQL that, when executed, effect the changes mapped therein to version 1.1, particularly as the checked-in version 1.0 is available in the repository. Accordingly, database operations, such as to add and delete data, including for newly created data tables. The MDM tool can be leveraged to add data to newly created tables as a function of the schema. For example, the MDM tool processes one or more XML files and generates code for adding data to respective data sources. Similarly, the MDM tool can be leveraged to delete data, including by processing one or more XML files and generating SQL for deleting data, accordingly.

Accordingly, SQL scripts can be automatically generated such as, to generate SQL for update queries for SYBASE database operations. States of database tables can be documented in one or more reports formatted in XML to be translated to update queries or SQL statements. Accordingly, database state changing can be monitored and acted on using input files. For example, a new database table can be generated based on a respective corresponding XML definition file. The input file can be a local file or the file can be source controlled, for example, in a git repo, as known in the art, and the configuration can originate based on the configuration file.

Accordingly, a form of a manifest file is usable by the MDM tool. For example, four XML files are processed in order to create a four new database tables. The manifest file identifies four files to be as part of an input and used by the MDM tool to generate SQL statements. As noted herein, complex database operations can be effected as a function of the manifest file, such as processing four or five files into single SQL statements. The manifest file is usable for the MDM tool to take the four or five files, use the current state of each and the MDM tool processes the information to determine database resources (e.g., libraries) required for the operations, including to generate code for combining a plurality of XML data files into a single new database table or to process one or more XML data files to be parsed into a two or more separate XML data files.

The present disclosure includes respective components, for example, included in or applicable by the MDM tool, including an XML difference ("diff") component. The XML diff component can process a plurality of XML data files and creates a plurality of folders for further processing. The set of XML files can be provided to the XML diff component, which determines a respective current state of each of the files, such as determine which represents an old version to be left unprocessed, an old version that requires revision(s), and which represents a new version (e.g., a modified form) of an existing data file, or a newly added data file. In operation, a comparison process is executed between a plurality of XML files and a tag automatically assigned to characterize the database operations (if any) that is to be executed as a function of programming code (e.g., SQL) generated by the MDM tool. For example, based on the diff component, complex database operation determinations can be made, such as whether a new column is to be added to an existing database table, whether data are to be updated (e.g., added, deleted, or modified), whether a column is to be removed, or other database management is to be effected. XML objects can be constructed automatically by the MDM tool, including as a function of delta determinations in response to the diff component.

In addition, determinations of the delta and new XML objects generated in response to determining the delta can be provided to an XML sort library. Database operations often require multiple operational steps and ordering the steps properly can be paramount for accurate and effective operations. In one or more implementations, a form of an XML sort library is provided that is usable by the MDM tool to reorganize information associated with the delta determined in one or more previous processing operations, and that are generated as part of the XML. For example, a data attribute requires updating and, thereafter, additional attribute(s) added to a simple database table. The MDM tool can generate SQL automatically that orders operations to include an "insert" statement to add a new column to a database table initially, followed by one or more "update" statements to add data within the new column. It is to be appreciated that this example is meant for illustrative purposes and that the MDM tool can operate to provide highly complex database operations and to order operations properly to ensure database integrity and accuracy is maintained, including to honor the primary or foreign key relationships. Moreover, the one or more records (e.g., "a side file") that can be generated in hypertext markup language ("HTML"). The side file can provide information identifying objects to be affected by the MDM tool operations and the order of steps or operations. For example, the side file identifies objects that have been determined automatically to be included in operations based on XML diff component, how those objects have been sorted. The side file can be particularly useful for developers, such as for debugging purposes.

In one or more implementations, the determined delta described herein can be processed to operate as a form of a database schema. The delta is usable, for example, by the MDM tool for processing a previous version of the table, such as set forth in one or more XML files, and to determine newly added lines in the one or more other XML files. The MDM tool operates to extract the new line(s) and form a new XML object, which can be posted to the XML sort library for downstream processing operations. The MDM tool can use the XML diff component and subsequent XML sort library to ensure that subsequently generated SQL (or other language) code that is executed by one or more computing devices maintains entity relationships between database objects (e.g., indexed database tables) and performs database operations thereon accurately. In one or more implementations of the present disclosure, once XML objects have been generated and sorted via the XML sort library, the MDM tool generates SQL, such as via a SQL generator module.

In one or more implementations of the present disclosure, each object to be implemented will have its own respective SQL statement(s) generated, including as a function of a schema. This provides a flexible architecture enabling dynamic switching between different database tables. In operation, the MDM tool can generate two or more XML objects. One of the two or more objects can represent or include the current (e.g., original) state of the object being affected and one of the objects can represent or include a future state of the object being affected. By maintaining at least one object in an original state, a previous version of the object is preserved and rollback operations to the previous version are supported. Such operations are useful, for example, when executing automatically generated SQL statements for database changes in one environment (e.g., a development or testing environment) initially and then again in a second environment (e.g., a production environment). This supports a form of validation, thereby preventing any problems caused by executing programming that is automatically generated by the MDM tool.

Referring now to the drawings, FIG. 1 shows a high-level overview of components 100 of the present disclosure, including MDM tool 102, metadata schema 104, data file source 106 and generated programming code and rollback 108.

Figure 2:
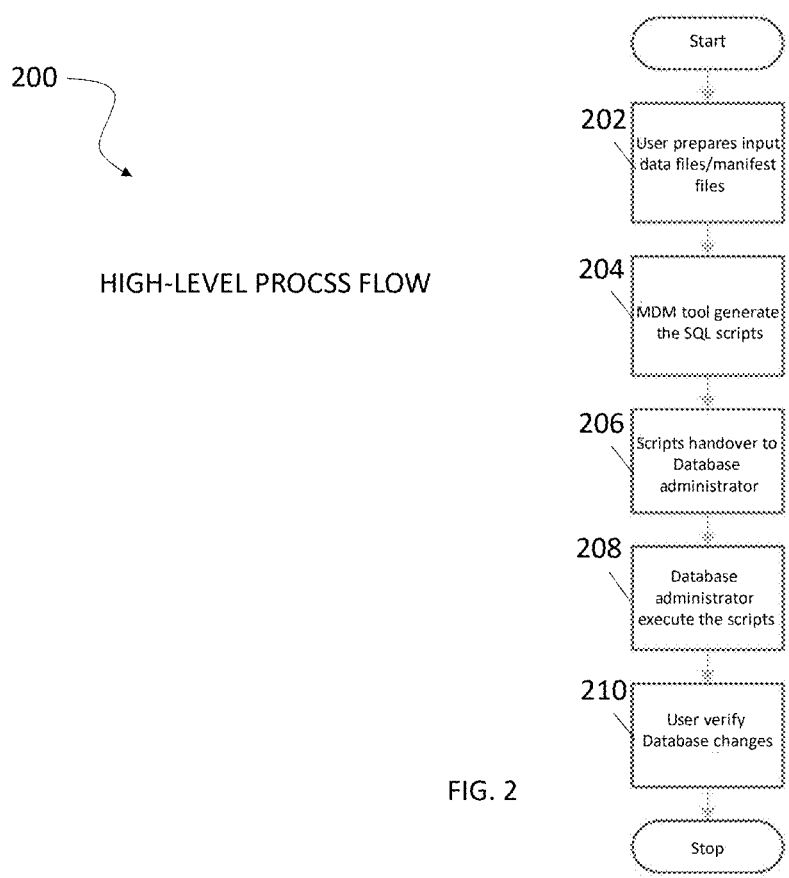
FIG. 2 is a flow chart illustrating example steps in a high-level process flow associated with an example implementation of the present disclosure.

FIG. 2 is a flow chart illustrating example steps 200 in a high-level process flow 200 associated with an example implementation of the present disclosure. It should be appreciated that several of the logical operations described herein can be implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 2, the process starts and a user prepares input data file(s) and/or manifest file(s) as a function of the MDM tool 102 (step 202). Thereafter, the MDM tool 102 generates SQL scripts automatically (step 204), which are provided for downtown processes, such as to be accessed by a database administrator (step 206). The scripts are executed (step 208) and database changes effected as a function of the scripts are verified (step 208). Thereafter, the process ends.

Figure 3:
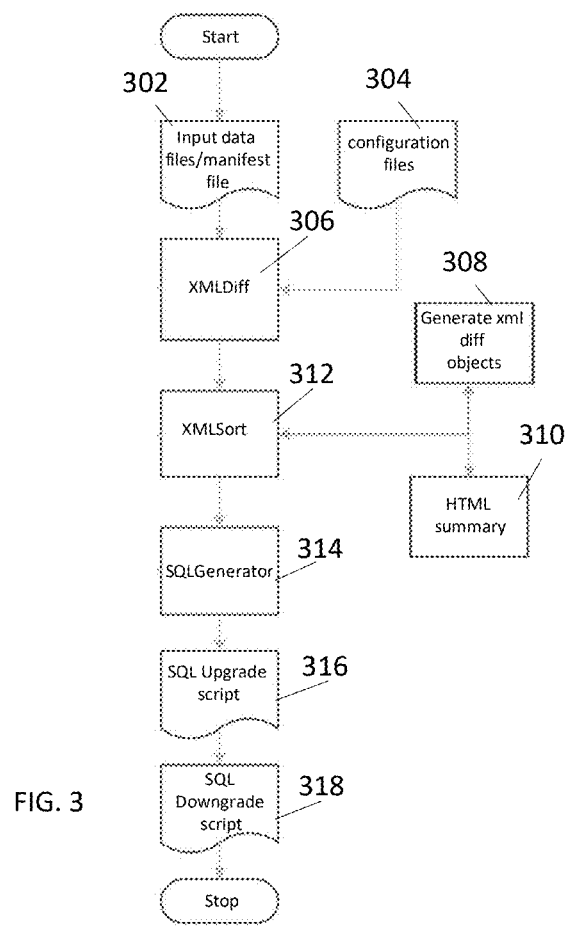
FIG. 3 is a process flow diagram illustrating an example implementation of the present disclosure including steps associated with automatic programming code generation.

FIG. 3 is a process flow diagram illustrating an example implementation of the present disclosure including steps 300 associated with automatic programming code generation. At step 302, input data file(s) and/or manifest file(s) are input into the MDM tool 102. Moreover, at step 304, one or more configuration files are provided. At step 306, revisions of XML are compared and change maps generated for nodes to be added, updated, and/or deleted for an upgrade from an old version to a new (e.g., revised) version, effectively providing XML Diff operation. Thereafter, XML diff objects are generated (step 308) and an HTML summary side file generated (step 310), which are passed for an XML sort process (step 312). In one or more implementations, rows are sorted in table node as a function of data and entity relationships.

Continuing with reference to FIG. 3, following the XML sort process, the MDM tool 102 generates SQL commands for effecting the data changes identified as results of XML Diff operation (step 314). Thereafter, code for database updates (e.g., a SQL upgrade script) is generated (step 316) and code for database downgrade (e.g., a SQL downgrade script) is generated (step 318). Thereafter the process ends (step 320).

Figure 4:
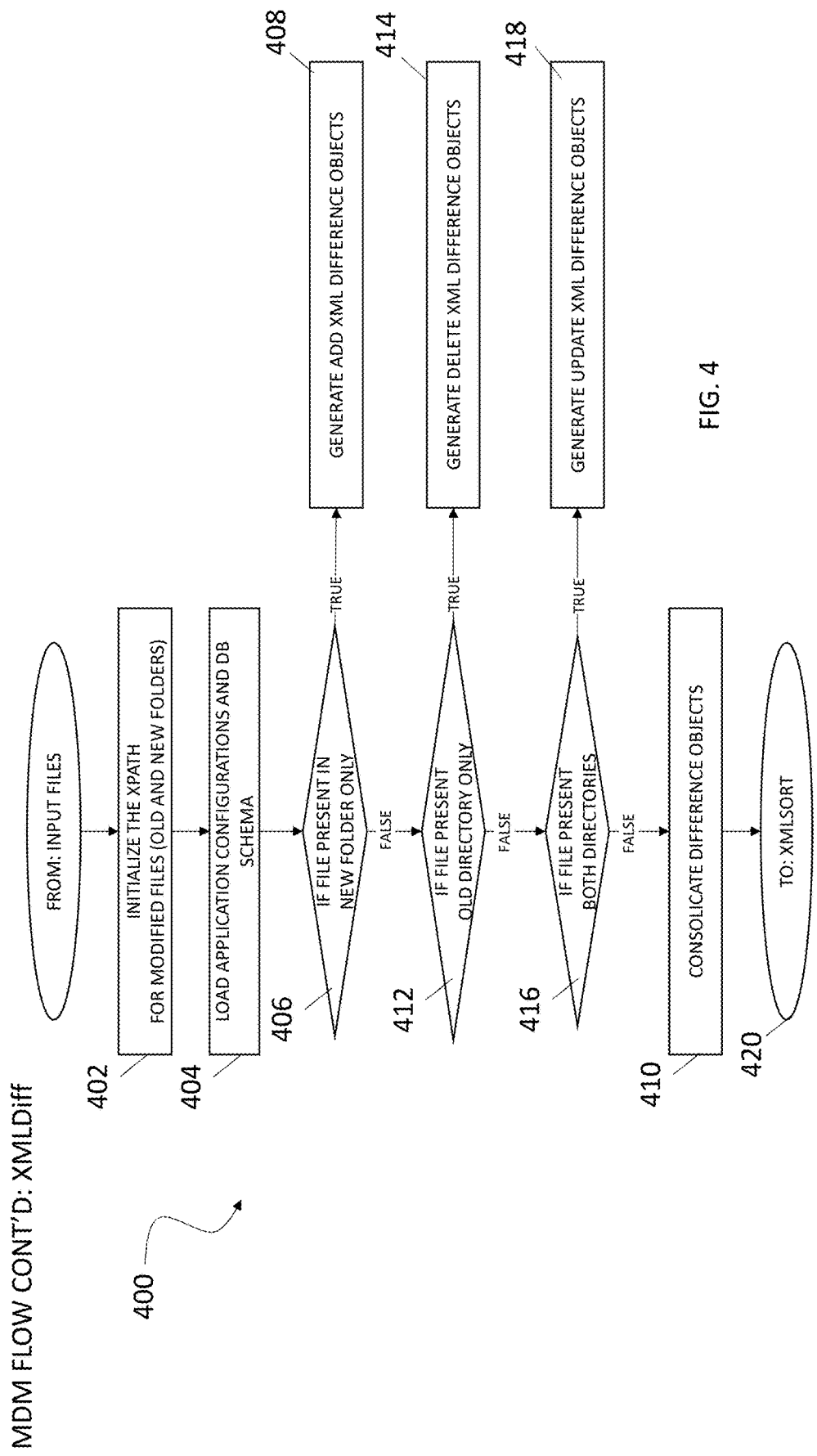
FIG. 4 illustrates example steps in a XML Diff process, in accordance with an example implementation of the present disclosure.

FIG. 4 illustrates example steps in an XML Diff process 400, in accordance with an example implementation of the present disclosure. At step 402, an XPath is initialized for modified files. The XPath initialization can support folders for old and new objects (e.g., "New" folder and "Old" folder), for storage of various versions of objects, as shown and described herein. Thereafter, at step 404 application configurations and a database schema are loaded for further processing. At step 406, a determination is made whether a respective file is provided exclusively in a "New" folder. If the determination at step 406 is affirmative, then the process branches to step 408 and "ADD" XML difference objects are generated. Thereafter, the process continues to step 410 and difference objects are consolidated. Alternatively, if the determination at step 406 is negative, then the process branches to step 412, and a further determination is made whether the respective file is present exclusively in an "Old" folder. If the determination at step 412 is affirmative, then the process branches to step 414 and Delete XML difference objects are automatically generated. Thereafter, the process continues to step 410, and difference objects are consolidated. Alternatively, if the determination at step 412 is negative, then the process branches to step 416, and a further determination is made whether the respective file is present in both the "New" and "Old" folders. If the determination at step 416 is affirmative, then the process branches to step 418 and Update XML difference objects are generated. Alternatively, if the determination at step 416 is negative, then the process branches to step 410, and difference objects are consolidated. Thereafter, the process continues to XML sort operations (step 420).

Figure 5:
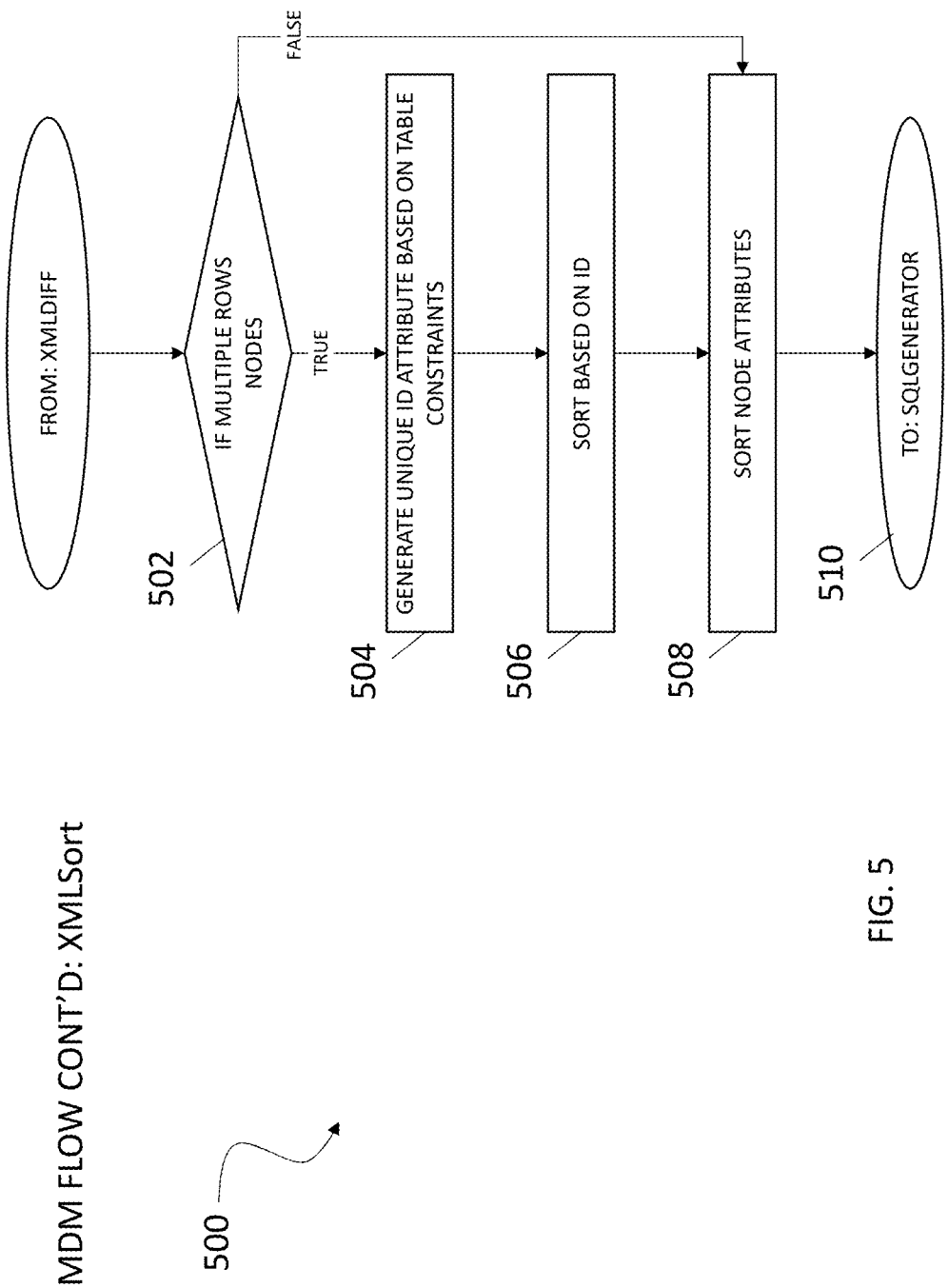
FIG. 5 illustrates example steps in a XML Sort process, in accordance with an example implementation of the present disclosure.

FIG. 5 illustrates example steps in an XML Sort process 500, in accordance with an example implementation of the present disclosure. At step 502, a determination is made to determine whether multiple rows of nodes are included. If the determination at step 502 is negative, then the process branches to step 508 and node attributes are sorted. Alternatively, if the determination at step 502 is affirmative, then the process branches to step 504 and unique identifiers are generated based on respective table constraints. Unique identifiers can be calculated based on constraints defined for a respective table structure, for example, if a table column's XML attribute defines constraint like unique or required. In such case, the tool can generate the unique identifier based on the combination of constraints. Thereafter, at step 506 and based on the respective unique identifiers, the MDM tool 102 performs sorting operations and, thereafter, at step 508 node attributes are sorted. Thereafter, the process continues to SQL generation (step 510).

Figure 6:
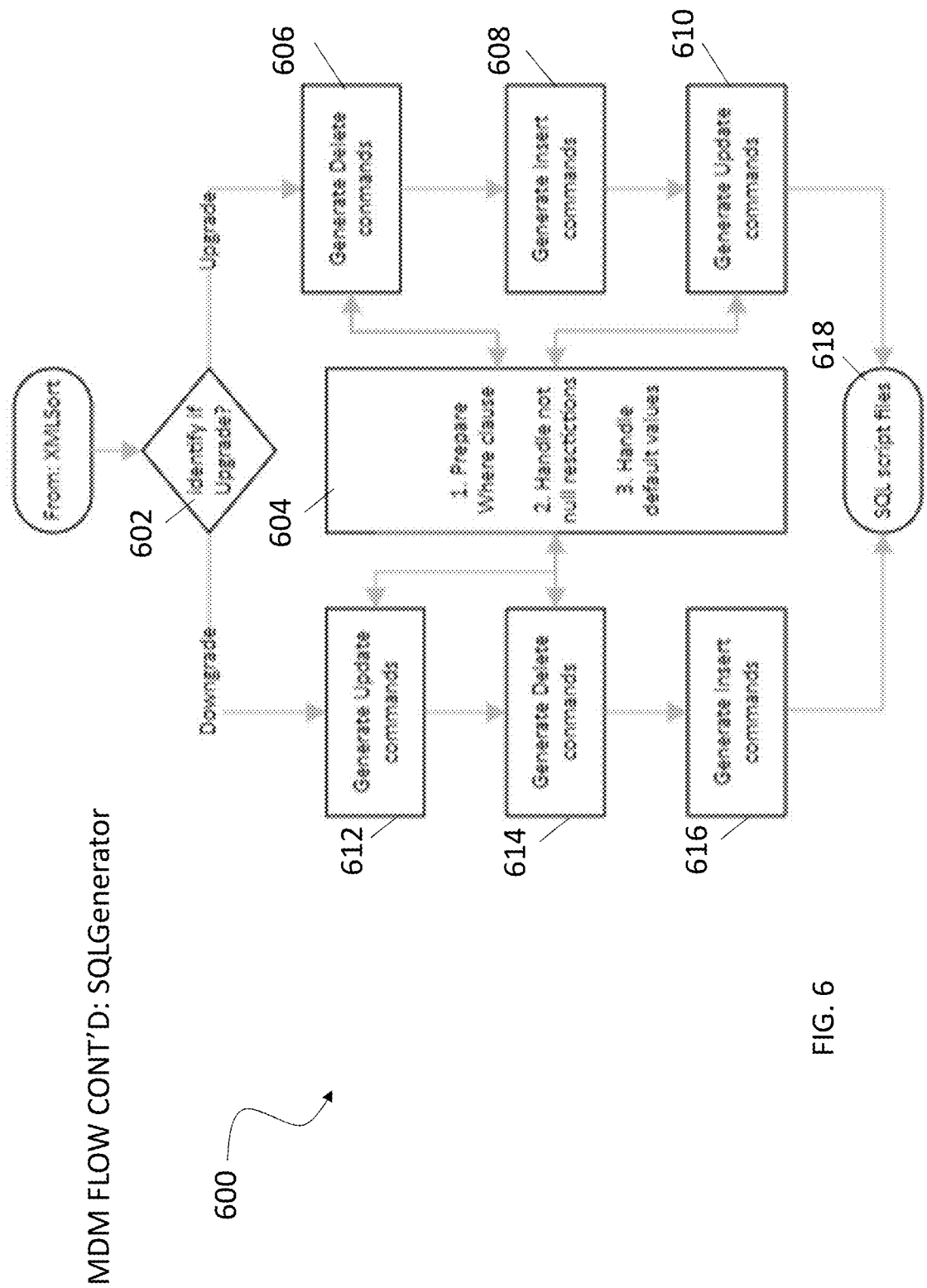
FIG. 6 is a process flow diagram illustrating an example implementation of the present disclosure, including steps associated with automatic programming code generation.

FIG. 6 is a process flow diagram illustrating an example implementation of the present disclosure, including steps 600 associated with automatic programming code generation. At step 602, a determination is made whether if a database operation is to include upgrading the database or downgrading (or restoring) the database. Depending on the outcome of the determination at step 602, respective where clauses are generated, respective not null restrictions are handled, and default values are handled in step 604, and respective output provided in further processes set forth in step 600. In the event the determination at step 602 is to upgrade, then the process branches to step 606 and delete commands, as needed, are generated. Thereafter, the process continues to step 608 and insert commands, as needed, are generated. Further, the process continues to step 610 and update commands, as needed, are generated. Thereafter, the process continues to step 618 and SQL script file(s) are generated. Alternatively, if the determination at step 602 is to downgrade, then the process branches to step 612 and update commands, as needed, are generated. Thereafter, the process continues to step 614 and delete commands, as needed, are generated. Further, the process continues to step 616 and insert commands, as needed, are generated. Thereafter, the process continues to step 618 and SQL script file(s) are generated.

FIG. 7 illustrates an example MDM tool 102 input file 700, which is usable by the MDM tool 102 for performing operations, such as shown and described herein. In the example file 700 illustrated in FIG. 7, two example table definitions 702, 704 are shown in connection with an existing database table ("Table1") are provided. Original file 702 identifies two columns for Table1, including column 1 equaling "1234" and column 2 equaling "12". Modified 704 shows Table1 with including column 1 still equaling "1234" but with column 2 equaling "123." Accordingly, database operations are required for revising the columns within Table1. The MDM tool 102 can use the information set forth in the input file 700 to alter Table1, accordingly, including as shown and described herein.

FIG. 8 illustrates results of an example XML Diff file process in results 800, which is usable by the MDM tool 102 for performing operations, such as shown and described herein. In the example results 800, change action "INSERT" is identified for Table1 in which Column2 is to be altered to "123," as shown and described herein with respect to FIG. 7.

Figure 9:
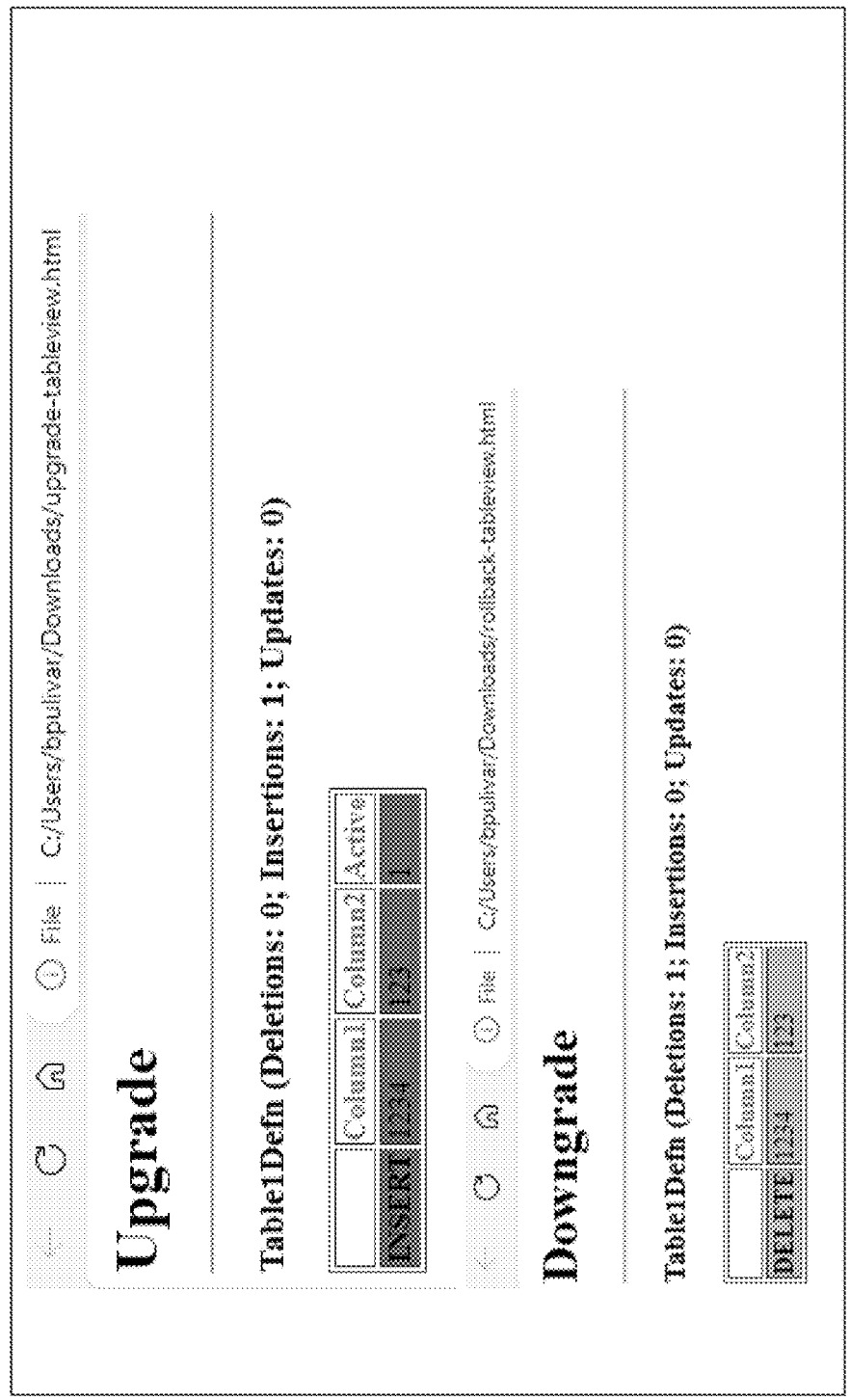
FIG. 9 illustrates an example side file, formatted in HTML and representing upgrade and down grade results associate with an example table.

FIG. 9 illustrates an example side file 900, formatted in HTML and representing upgrade and down grade results associate with Table1 (FIGS. 7 and 8). As shown in side file 900, upgrading for Table1 definition ("Table1Defn") includes 0 deletions, 1 insertion, and 0 updates. Alternatively, downgrading for Table1 definition ("Table1Defn") includes 1 deletion, 0 insertions, and 0 updates. As noted herein, the information provided in side file 900 is usable for identifying changes taken or set forth for taking in connection with updating or downgrading database operations as a function of automatically generated SQL.

Figure 10:
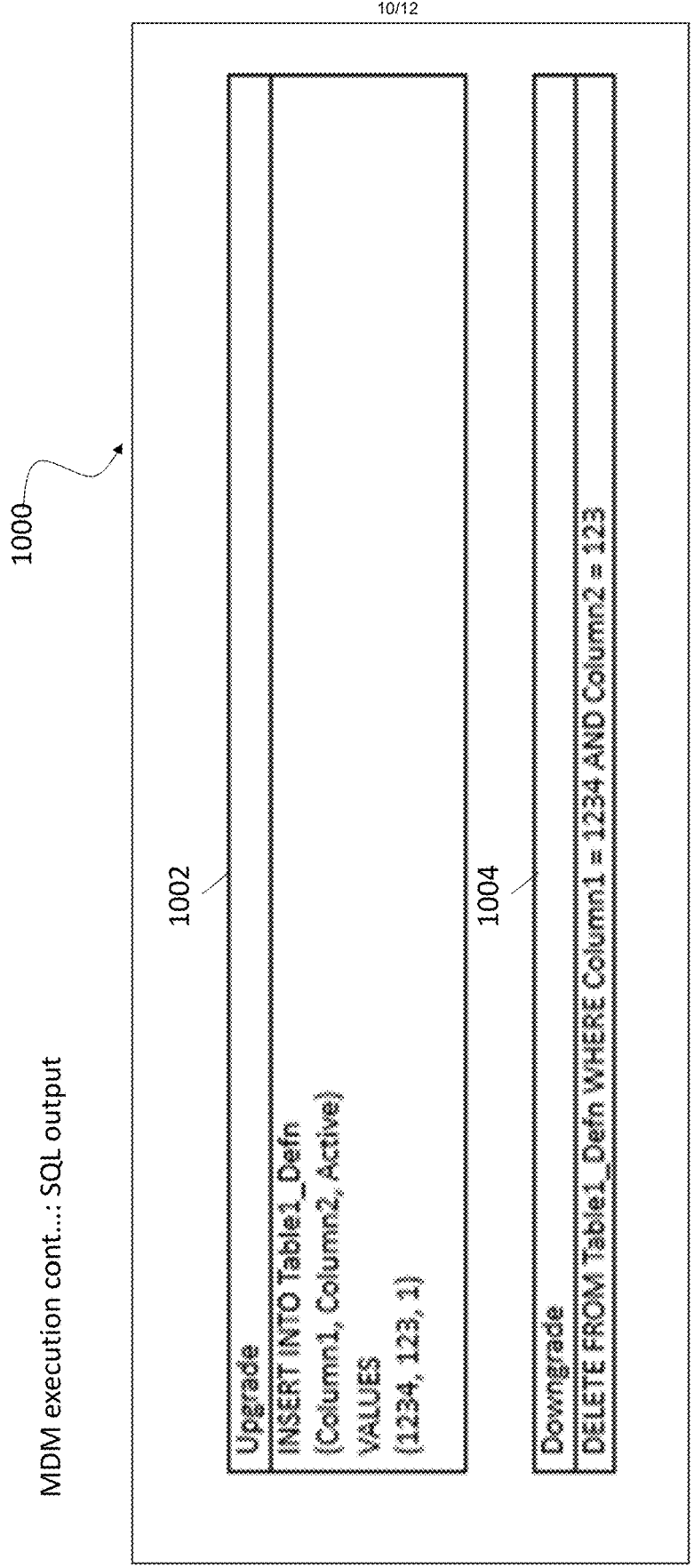
FIG. 10 illustrates example SQL output generated by the metadata management tool.

FIG. 10 illustrates example SQL output 1000 generated by the MDM tool 102, and includes upgrade SQL output 1002 and downgrade SQL output 1004, pursuant to the example shown and described herein with reference to FIGS. 7-9.

Accordingly, and as shown and described herein, the present disclosure provides powerful and flexible database management and operations in an elegant and convenient solution. Complex database operations can be effected as a function of programming code that is generated automatically in response to information received in one or more input files. Moreover, HTML or formatted output can be generated providing access to historic actions and programming code (e.g., SQL) generation. The present disclosure includes a plurality of components, including for XML object generator, determining database differences and sorting operations, and generating output (e.g., SQL). In one or more implementations, the base underlying language can be PERL, although other input and output language options are supported. This can be implemented in any suitable high-level language, such as PYTHON and JAVA. The tool can be leveraged to generate scripts for any suitable relational database.

In operation, the present disclosure includes one or more computing devices configured by executing programming instructions to update/add XML files. Further, modified files can be placed in a repository or changes committed changes to version control. Once information is input, data processing can occur including to load the modified and original files into configured folders. Thereafter, XML data objects can be prepared for modified and added files, for using XMLDiff and XMLSort. The XML object can be classified as insert, update, delete files and, thereafter, passed to a module written in PERL for generating SQL statements, the "SQLGenerator" module.

Figure 11:
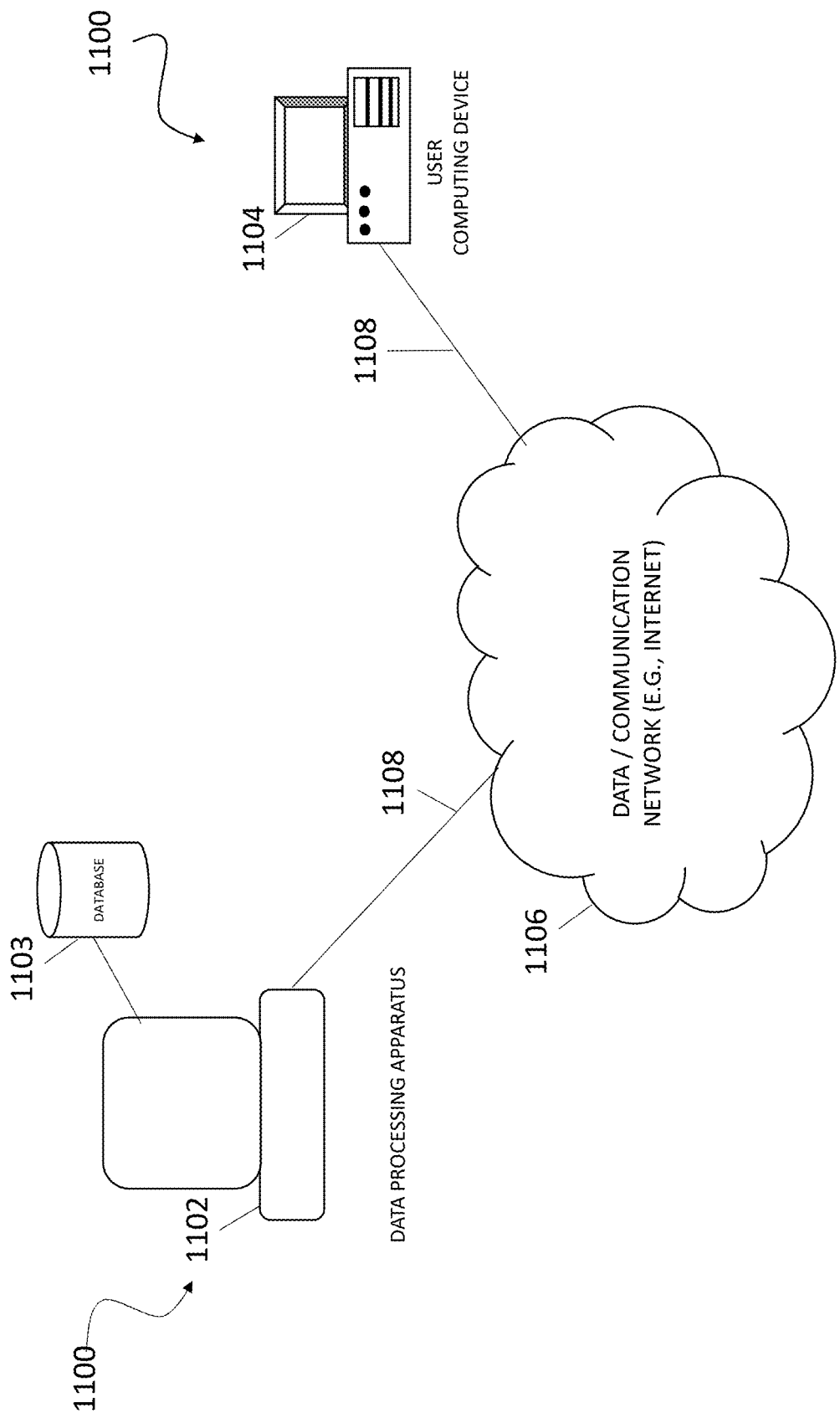
FIG. 11 is a diagram that shows an example hardware arrangement that is configured for providing the systems and methods disclosed herein.

Referring to FIG. 11, a diagram is provided that shows an example hardware arrangement that is configured for providing the systems and methods disclosed herein and designated generally as system 1100. System 1100 can include one or more information processors 1102 that are at least communicatively coupled to one or more user computing devices 1104 across communication network 1106. Information processors 1102 and user computing devices 1104 can include, for example, mobile computing devices such as tablet computing devices, smartphones, personal digital assistants or the like, as well as laptop computers and/or desktop computers, server computers and mainframe computers. Further, one computing device may be configured as an information processor 1102 and a user computing device 1104, depending upon operations being executed at a particular time.

With continued reference to FIG. 11, information processor 1102 can be configured to access one or more databases 1103 for the present disclosure, including source code repositories and other information. However, it is contemplated that information processor 1102 can access any required databases via communication network 1106 or any other communication network to which information processor 1102 has access. Information processor 1102 can communicate with devices comprising databases using any known communication method, including a direct serial, parallel, universal serial bus ("USB") interface, or via a local or wide area network.

User computing devices 1104 can communicate with information processors 1102 using data connections 1108, which are respectively coupled to communication network 1106. Communication network 1106 can be any data communication network. Data connections 1108 can be any known arrangement for accessing communication network 1106, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 1104 preferably have the ability to send and receive data across communication network 1106, and are equipped with web browsers, software disclosures, or other means, to provide received data on display devices incorporated therewith. By way of example, user computing device 1104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 1106, and that wireless communication can be provided between wireless devices and information processors 1102.

System 1100 preferably includes software that provides functionality described in greater detail herein, and preferably resides on one or more information processors 1102 and/or user computing devices 1104. One of the functions performed by information processor 1102 is that of operating as a web server and/or a web site host. Information processors 1102 typically communicate with communication network 1106 across a permanent i.e., un-switched data connection 1108. Permanent connectivity ensures that access to information processors 1102 is always available.

Figure 12:
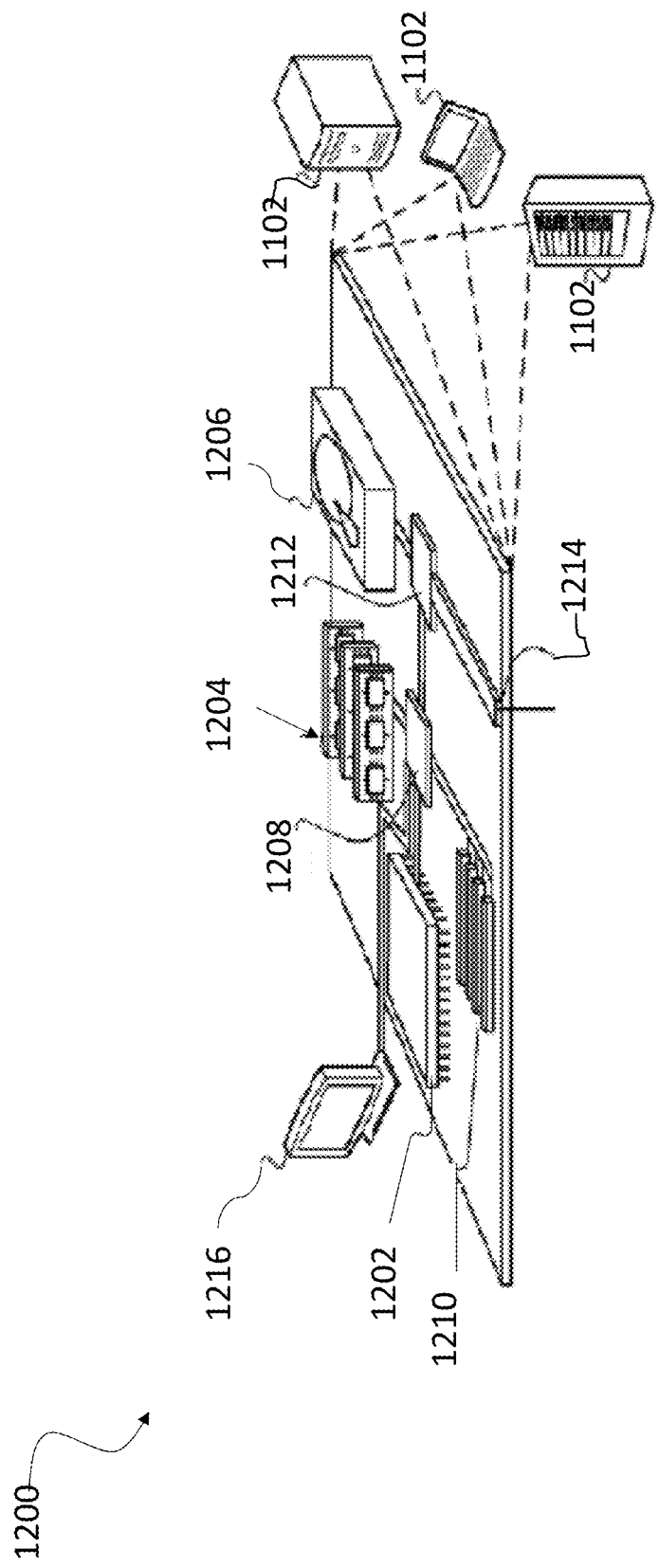
FIG. 12 shows an example information processor and/or user computing device that can be used to implement the techniques described herein.

FIG. 12 shows an example information processor 1102 and/or user computing device 1104 that can be used to implement the techniques described herein. The information processor 1102 and/or user computing device 1104 is intended to represent various forms of digital computers, such as laptops, desktops, workstations, personal digital assistants, servers, blade servers, mainframes, and other appropriate computers. The components shown in FIG. 12, including connections and relationships, and their functions, are meant to be exemplary only, and are not meant to limit implementations of the inventions described and/or claimed in this document.

As shown in FIG. 12, the information processor 1102 and/or user computing device 1104 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the information processor 1102 and/or user computing device 1104, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the information processor 1102 and/or user computing device 1104. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the information processor 1102 and/or user computing device 1104. In some implementations, the storage device 1206 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 can be configured to manage bandwidth-intensive operations, while the low-speed interface 1212 can be configured to manage lower bandwidth-intensive operations. Of course, one of ordinary skill in the art will recognize that such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In an implementation, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as ¬¬ laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing,"

"involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed:

1. A computer-implemented method for generating programming code automatically for performing database operations, the method comprising:
   accessing, by at least one computing device configured by executing programming instructions stored on processor, at least one input file;
   processing, by the at least one computing device, the at least one input file to identify at least one operation to be performed on an object associated with a database, wherein the processing further includes generating a database schema;
   generating, by the at least one computing device, a plurality of data files representing the at least one operation,
   wherein generating the at least one data file comprises:
      generating a first folder for storing at least one database schema file representing database operations associated with a new database object;
      generating a second folder for storing at least one database schema file representing database operations associated with an existing database object;
      determining, as a function of processing the at least one input file, that the at least one database schema file is to be stored in at least one of the first folder and the second folder; and
      storing, as a function of the determining, the at least one database schema file in at least one of the first folder and the second folder;
   sorting, by the at least one computing device, information in the at least one data file;
   determining, by the at least one computing device as a function of the sorting, an order of steps associated with the at least one operation; and
   automatically generating, by the at least one computing device, programming code for performing the at least one database operation in accordance with the determined order of steps.

2. The method of claim 1, further comprising:
   where the at least one database schema file is stored in only the first folder:
      generating, by the at least one computing device, programming code to include at least one programming statement for adding a database operation;
   where the at least one database schema file is stored in only the first folder:
      generating, by the at least one computing device, programming code to include at least one programming statement for an add database operation;
   where the at least one database schema file is stored in only the second folder:
      generating, by the at least one computing device, programming code to include at least one programming statement for a delete database operation; and
   where the at least one database schema file is stored in both the first folder and the second folder:
      generating, by the at least one computing device, programming code to include at least one programming statement for an update database operation.

3. The method of claim 1, wherein sorting, by the at least one computing device, the information in the at least one data file further comprises:
   performing, by the at least one computing device, a diff operation and generating, as a function of the diff operation, at least one node including the information;
   identifying, by the at least one computing device, multiple rows of data in the at least one node;
   generating, by the at least one computing device, a respective identifier associated with each of the rows; and
   sorting, by the at least one database, the information set forth each of the rows based on the respective identifier.

4. The method of claim 1, wherein at least one of the plurality of generated data files is associated with implementing an upgrade to a database table and at least one of the plurality of generated data files is associated with implementing a downgrade to the database table.

5. The method of claim 4, wherein generating the programming code further comprises:
   generating, by the at least one computing device, at least one of a delete command, an insert command, and an update command for implementing the upgrade to the database table; and
   generating, by the at least one computing device, at least one of an update command, a delete command, and an insert command for implementing the downgrade to the database table.

6. The method of claim 5, further comprising:
   determining, by the at least one computing device, for each of the upgrade to the database table and the downgrade to the database table, existence of a not null restriction and default values; and
   preparing at least one where clause as a function of the determining the not null restriction and the default values.

7. The method of claim 1, further comprising:
   providing, by the at least one computing device, a metadata management tool that, when executed by the at least one computing device, automatically generates the programming code for performing the at least one database operation.

8. The method of claim 1, wherein the programming code is structured query language.

9. The method of claim 1, wherein the at least one database operation is to be performed in SYBASE.

10. A computer-implemented system for generating programming code automatically for performing database operations, the system comprising:
    a computing device having at least one processor that, when executing instructions stored on non-transitory processor readable media, is configured to:
    access at least one input file;
    process the at least one input file to identify at least one operation to be performed on an object associated with a database, wherein the processing further includes generating a database schema;
    generate a plurality of data files representing the at least one operation, including by:
       generating a first folder for storing at least one database schema file representing database operations associated with a new database object;

generating a second folder for storing at least one database schema file representing database operations associated with an existing database object;

determining, as a function of processing the at least one input file, that the at least one database schema file is to be stored in at least one of the first folder and the second folder; and storing, as a function of the determining, the at least one database schema file in at least one of the first folder and the second folder;

sort information in the at least one data file;

determine, as a function of the sorting, an order of steps associated with the at least one operation; and automatically generate programming code for performing the at least one database operation in accordance with the determined order of steps.

11. The system of claim 1, wherein the at least one computing device is further configured to:

where the at least one database schema file is stored in only the first folder:
generate programming code to include at least one programming statement for adding a database operation;

where the at least one database schema file is stored in only the first folder:
generate programming code to include at least one programming statement for an add database operation;

where the at least one database schema file is stored in only the second folder:
generate programming code to include at least one programming statement for a delete database operation; and where the at least one database schema file is stored in both the first folder and the second folder:
generate programming code to include at least one programming statement for an update database operation.

12. The system of claim 10, wherein sorting the information in the at least one data file further comprises:

performing a diff operation and generating, as a function of the diff operation, at least one node including the information;

identifying multiple rows of data in the at least one node;

generating a respective identifier associated with each of the rows; and sorting the information set forth each of the rows based on the respective identifier.

13. The system of claim 10, wherein at least one of the plurality of generated data files is associated with implementing an upgrade to a database table and at least one of the plurality of generated data files is associated with implementing a downgrade to the database table.

14. The system of claim 13, wherein the programming code is generated by:

generating at least one of a delete command, an insert command, and an update command for implementing the upgrade to the database table; and generating at least one of an update command, a delete command, and an insert command for implementing the downgrade to the database table.

15. The system of claim 14, wherein the at least one computing device is further configured to:

determine, for each of the upgrade to the database table and the downgrade to the database table, existence of a not null restriction and default values; and prepare at least one where clause as a function of the determining the not null restriction and the default values.

16. The system of claim 10, wherein the at least one computing device is further configured to:

provide a metadata management tool that, when executed by the at least one computing device, automatically generates the programming code for performing the at least one database operation.

17. The system of claim 10, wherein the programming code is structured query language.

18. The system of claim 10, wherein the at least one database operation is to be performed in SYBASE.

\* \* \* \* \*